(12) United States Patent
Amamoto et al.

(10) Patent No.: US 8,080,162 B2
(45) Date of Patent: Dec. 20, 2011

(54) METHOD FOR SEPARATING FISSION PRODUCT, AND APPARATUS USED THEREFOR

(75) Inventors: Ippei Amamoto, Ibaraki (JP); Hirohide Kofuji, Ibaraki (JP); Mineo Fukushima, Ibaraki (JP); Munetaka Myochin, Ibaraki (JP)

(73) Assignee: Japan Atomic Energy Agency, Ibaraki (JP)

( * ) Notice: Subject to any disclaimer, the term of this patent is extended or adjusted under 35 U.S.C. 154(b) by 200 days.

(21) Appl. No.: 12/656,180

(22) Filed: Jan. 20, 2010

(65) Prior Publication Data
US 2010/0294720 A1    Nov. 25, 2010

(30) Foreign Application Priority Data

May 21, 2009    (JP) .................... 2009-115608

(51) Int. Cl.
*B01D 15/00*    (2006.01)
*G21F 9/16*    (2006.01)
(52) U.S. Cl. ........ 210/663; 210/668; 210/263; 210/175; 210/282; 210/291; 588/2; 588/11; 588/20
(58) Field of Classification Search .................. 210/663, 210/668, 263, 175, 282, 291; 588/2, 11, 588/20
See application file for complete search history.

(56) References Cited

U.S. PATENT DOCUMENTS

| | | | | |
|---|---|---|---|---|
| 4,192,742 A | * | 3/1980 | Bernard et al. | 210/614 |
| 5,750,824 A | * | 5/1998 | Day | 588/256 |
| 5,960,367 A | * | 9/1999 | Kita | 455/567 |
| 5,960,368 A | * | 9/1999 | Pierce et al. | 588/10 |

FOREIGN PATENT DOCUMENTS

JP    2007-303934    11/2007

OTHER PUBLICATIONS

Ippei Amamoto et al., "Fundamental Study on Electrolyte Recycle Process by Phosphate Conversion Technique, Recovery of Precipitates", Nihon Genshiryoku Gakkai "2008-nen Haru-no-nenkai Youshishu D35" (2008 Annual Meeting, Spring, Collected Summaries: D35), p. 179, and English translation thereof.
Ippei Amamoto et al., "Fundamental Study on Electrolyte Recycle Process by Phosphate Conversion Technique, Evaluation of FP Precipitates Formation", Nihon Genshiryoku Gakkai "2009-nen Haru-no-nenkai Youshishu C07" (2009 Annual Meeting (Spring), Collected Summaries: C07), and English translation thereof.

* cited by examiner

*Primary Examiner* — Chester Barry
(74) *Attorney, Agent, or Firm* — Wenderoth, Lind & Ponack, L.L.P.

(57) ABSTRACT

Provided is a method that can remove fission products in a spent electrolyte produced in a dry reprocessing process by an easy operation and can vitrify the fission products easily, the fission products including not only the fission products that generate precipitate but also the fission products that generate no precipitate. A spent electrolyte produced in a dry reprocessing process is subjected to a phosphate conversion processing to obtain a processing target substance; the processing target substance is passed through a separating material 10 including an iron phosphate glass at a temperature of not more than a softening point of the iron phosphate glass in order to remove insoluble fission products included in the processing target substance by filtration with the separating material and to sorb fission products in solution to the separating material for separation; and the iron phosphate glass holding the fission products is used as a waste vitrification material.

6 Claims, 2 Drawing Sheets

METHOD FOR SEPARATING FISSION PRODUCT, AND APPARATUS USED THEREFOR

BACKGROUND OF THE INVENTION

1. Field of the Invention

The present invention relates to a method for removing fission products in a spent electrolyte produced in a pyro-reprocessing process and an apparatus used therefor.

2. Description of the Related Art

A spent electrolyte (salt waste) produced from a pyro-reprocessing process using metal electrolysis contains various fission products, and is classified into a high-level radioactive waste. An electrolyte used in the pyro-reprocessing process includes LiCl—KCl as the medium. Fission products (FPs) mainly containing elements such as alkali metals, alkaline earth metals, and rare earth elements are dissolved into the spent electrolyte as chlorides. Then, from viewpoints of reduction in environmental impact, economical efficiency, and the like, the fission products in the spent electrolyte need to be separated for reduction in a volume of the high-level radioactive waste and for regeneration and reuse of the spent electrolyte.

A method for processing a spent electrolyte has been proposed as a technique of separation of the fission products and regeneration of the medium, including: a spent electrolyte regeneration step of reacting FP chlorides accumulated in the spent electrolyte with phosphates to convert the FP chlorides into FP phosphates, precipitating the FP phosphates, and regenerating the medium; a phosphate conversion step of reacting excessive salts produced by the spent electrolyte regeneration step with phosphoric acid to convert the excessive salts into phosphates; and a phosphate immobilization step for stabilizing the produced phosphates by filling iron phosphate glass with the produced phosphates (see Japanese Patent Laid-Open No. 2007-303934).

As a phosphate conversion material that precipitates and separates the fission products dissolved as chlorides, lithium phosphate ($Li_3PO_4$) or potassium phosphate ($K_3PO_4$) is suitable for its smaller influence given to the composition of the electrolyte. When lithium phosphate ($Li_3PO_4$) or potassium phosphate ($K_3PO_4$) is used, chlorides of lanthanoid series (Ln) are easily converted into phosphates so that phosphates are precipitated. However, chlorides of alkali metals (except Li) and alkaline earth metals form no precipitate irrespective of addition of, the conversion material.

A method for separating the precipitate is generally filtration. Various filtration apparatuses have conventionally existed. However, the filtration apparatuses are usually used at room temperature, and such filtration apparatuses hardly can separate a target substance in a melt with a high temperature. In addition, the target substance for separation includes not only FP elements that produce precipitates but also FP elements that produce no precipitate. Therefore, ordinary filtering materials cannot sufficiently remove all of these FP elements.

Then, the related prior art needs two separation and recovery methods for separating and removing the fission products dissolved into the spent electrolyte, and it has been examined that a liquid mainly containing a precipitate and a supernatant are selectively fed, the liquid containing the precipitate is separated by a filtration filter, and the supernatant is separated using a separation filter having ion exchange capacity/molecular sieving capacity (see Nihon Genshiryoku Gakkai "2008-nen Haru-no-nenkai" Youshishu D35). However, this method has had problems to be solved in practice such that operation is complicated, a dedicated worker must be disposed, and the configuration of the apparatus is complicated.

SUMMARY OF THE INVENTION

An object of the present invention is to provide a method that can remove fission products in a spent electrolyte produced in a pyro-reprocessing process by an easy operation and can vitrify the fission products easily, the fission products including not only the fission products that produce precipitate but also the fission products that produce no precipitate.

Another object of the present invention is to provide an apparatus having a simple configuration that can remove fission products in a spent electrolyte produced in a pyro-reprocessing process, the fission products including not only the fission products that produce precipitate but also the fission products that produce no precipitate.

The present invention provides a method for separating fission products, comprising subjecting a spent electrolyte produced in a pyro-reprocessing process to a phosphate conversion processing to obtain a processing target substance; passing the processing target substance through a separating material comprising an iron phosphate glass at a temperature of not more than a softening point of the iron phosphate glass in order to remove insoluble fission products included in the processing target substance by filtration with the separating material and to sorb fission products in solution to the separating material for separation; and using the iron phosphate glass holding the fission products as a waste vitrification material. As one feature of the present invention, thus, filtration of the insoluble substance and sorption of the substance in solution are simultaneously performed to separate and remove the fission products, and the vitrified waste is produced using the separating material holding the fission products. Here, an atmosphere of the processing target substance can be adjusted by an inert gas supplied from a pressurization system, and simultaneously passage of the processing target substance through the separating material can be accelerated by applying pressure to the liquefied processing target substance.

Moreover, the present invention provides an apparatus for implementing the method for separating fission products as mentioned above, including: a separator body including a cylindrical separation container filled with a separating material; a feed opening for a processing target substance opened in an upper portion of the separation container; a refined liquid receiver tank that communicates with a lower portion of the separation container; a pressurization system that can apply pressure to the processing target substance supplied to the separation container; a suction system connected with the refined liquid receiver tank; a heating element that controls a temperature within the apparatus; wherein the separating material comprises an iron phosphate glass. As for composition of the iron phosphate glass, an Fe/P ratio is 0.15 to 0.75. Preferably, the iron phosphate glass is used as the separating material in a shape of powders or a shape of fibers, or used as the separating material by heating the powders or fibers to a softening point of the iron phosphate glass and molding and processing the powders or fibers so as to have a cartridge form.

In the method for separating fission products according to the present invention, an iron phosphate glass is used as the separating material, a spent electrolyte produced in a pyro-reprocessing process is subjected to a phosphate conversion processing to obtain a processing target substance and the processing target substance is passed through the separating material. Thereby, while the insoluble fission products are filtered off, the fission products in solution are sorbed to be separated. Accordingly, not only the fission products that produce precipitate but also the fission products that produce no precipitate can be easily removed only by a simple operation to pass the processing target substance through the separating material. For that reason, a large amount of the spent electrolyte can be processed with high efficiency. Further, the fission products can be separated in parallel with an operation to move the processing target substance. For that reason, it is unnecessary to dispose a worker dedicated to the separation operation.

Moreover, an iron phosphate glass used as the separating material holding the fission products can be used as the material for a vitrified waste as it is. For that reason, an amount of the high-level radioactive waste produced can be reduced. Additionally, the refined electrolyte after separation of the fission products can be used as a regenerated medium. For that reason, decrease in a volume of the waste owing to reuse of the electrolyte can also be expected.

The separator for the fission products according to the present invention has a configuration in which the cylindrical separation container is filled with the separating material containing an iron phosphate glass, and the processing target substance is passed through the separating material. Accordingly, the separator can simultaneously remove not only the fission products that produce precipitate but also the fission products that produce no precipitate by the filtration function and the sorption function, although the configuration of the separator is very simple. The separator can be easily incorporated into a process because of its very simple configuration. In addition, this separator is configured as a closed system, and a worker does not directly contact a melt with a high temperature irrespective of an installation place of the separator or an operation method thereof. For that reason, the worker is not exposed to the risk of a burn, and radioactive substances and the like are not scattered.

When the separating material is used in a cartridge form here, replacement after separation can be performed easily. Moreover, since the separator may be added to a liquid feeding line, the separator can be easily enlarged depending on the amount to be processed. Further, when the separator body is designed so as to have a multistage configuration when necessary, the separator can demonstrate a sufficient separating capacity particularly for the fission products that produce no precipitate.

DETAILED DESCRIPTION OF THE PREFERRED EMBODIMENT

Figure 1:
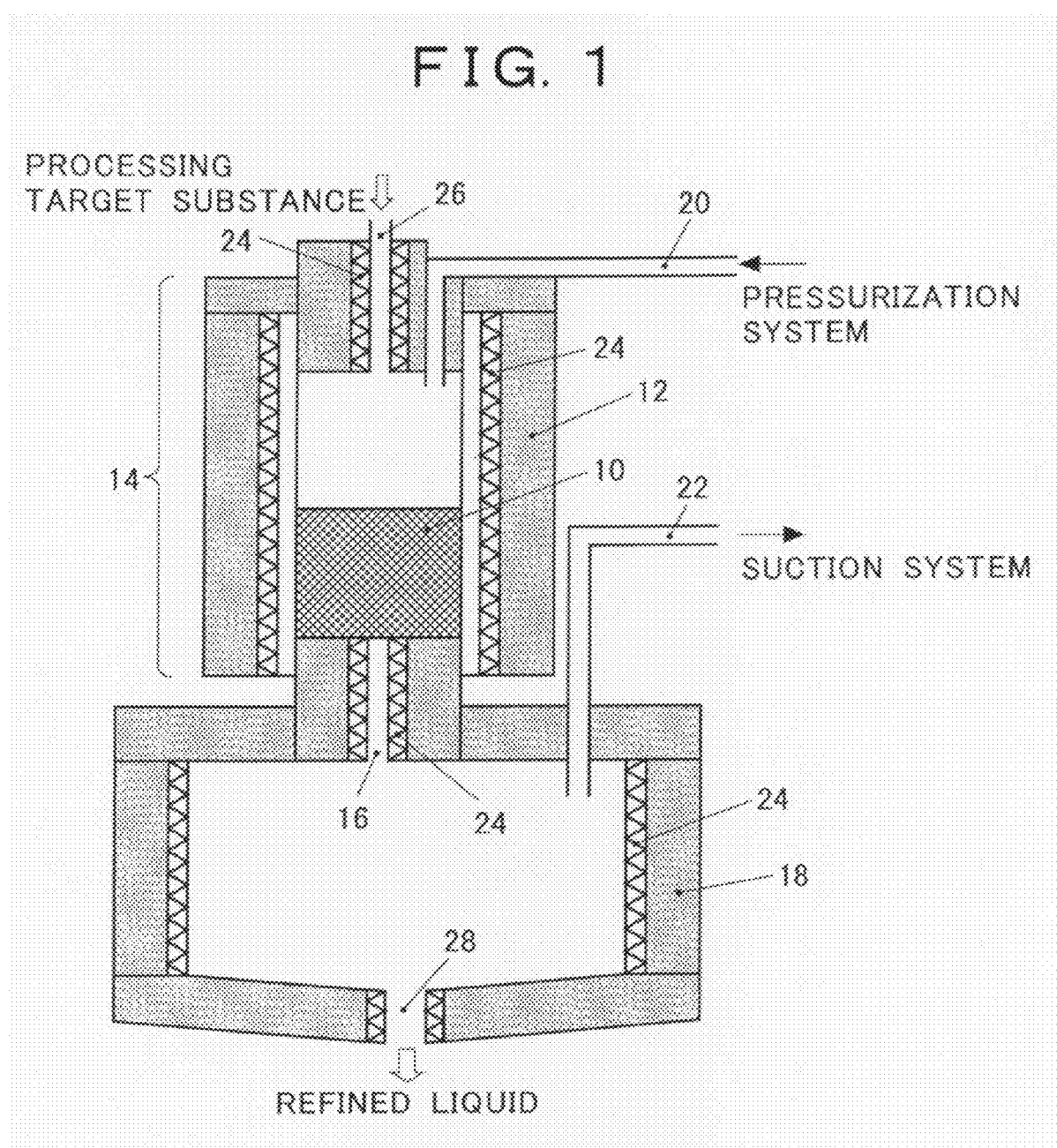
FIG. 1 is an explanatory view showing one embodiment of a separator for fission products according to the present invention.

In the present invention, a spent electrolyte produced in a pyro-reprocessing process is subjected to a phosphate conversion processing to obtain a processing target substance and the processing target substance is passed through a separating material comprising an iron phosphate glass at a preset temperature of not more than a softening point of the iron phosphate glass (usually, approximately 500 to 600° C.).

As mentioned above, the fission products mainly containing elements such as alkali metals, alkaline earth metals, and rare earth elements are dissolved into a spent electrolyte (LiCl—KCl) as chlorides. The chlorides are converted into phosphates by a phosphate conversion material. For example, lithium phosphate ($Li_3PO_4$) is used as the phosphate conversion material. As conversion conditions, a temperature is 520 to 600° C., for example, and the amount of the phosphate conversion material to be added is approximately 2 to 4.5 times in stoichiometry. At this time, lithium and the rare earth elements form insoluble substances. On the other hand, other alkali metals and the alkaline earth metals do not form any remarkable insoluble substance, and many of them are dissolved. However, when the processing target substance is passed through the separating material, not only the insoluble fission products included are filtered off, but also the fission products in solution are sorbed to be separated.

In the process under a high temperature condition, in order to suppress influences of moisture and oxygen, it is necessary to reduce a partial pressure of oxygen and a moisture content as much as possible, by which LiCl—KCl salts can be re-used as an electrolyte for the pyro-reprocessing process. Deterioration of the separating material can also be prevented. Then, the atmosphere of the processing target substance is adjusted by supplying an inert gas such as argon gas or nitrogen gas. The processing target substance can also be smoothly passed through the separating material by applying pressure to the processing target substance with the inert gas.

Even when the phosphate conversion process is performed, the alkali metals except lithium and the alkaline earth metals produce no precipitate. While a part of them produces fine insoluble double salts, the remainder is still dissolved. However, the alkali metals except lithium and the alkaline earth metals are also sorbed to be separated by the separating material made of an iron phosphate glass. As for an iron phosphate glass ($Fe_2O_3.P_2O_5$), a known phase diagram shows that increasing in the temperature of the iron phosphate glass changes trivalent iron ($Fe^{3+}$) into divalent iron ($Fe^{2+}$). Following this, because of the relationship with an oxygen ion ($O^{2-}$) that forms the iron phosphate glass, the valence number of ions within the system becomes unstable. As a result, an effect of sorbing the other elements emerges. The present invention uses this effect. Thus, the iron phosphate glass that can demonstrate the sorption effect by increasing the temperature also has thermal resistance. Accordingly, the iron phosphate glass is excellent as a separating material used at a high temperature, and can simultaneously separate the insoluble fission products by the filtration function and the fission products in solution by the sorption function.

The iron phosphate glass holding the fission products after the separation process is used as a waste vitrification material as it is. The components of the iron phosphate glass holding the fission products are adjusted to be stabilized as an iron phosphate glass vitrified waste. Thereby, the amount of the high-level radioactive wastes produced can be reduced. The refined electrolyte after separation of the fission products can be used as a reproduced electrolyte. For that reason, decrease of the amount of wastes owing to reuse of the electrolyte can also be expected.

Embodiment

FIG. 1 shows one embodiment of the separator according to the present invention. The separator includes a separator body 14 formed of a cylindrical separation container 12 filled with a separating material 10; a refined liquid receiver tank 18 connected from the lower portion of the separation container 12 through a refined liquid feeding pipe 16; a pressurization system 20 that can apply pressure to the processing target substance supplied to the separation container 12; a suction system 22 connected with the refined liquid receiver tank 18; and a resistance heating element 24 that controls the temperature of the separator, and the like. The separation container 12 and the refined liquid receiver tank 18 are made of a heat insulator, a firebrick, etc. Here, an iron phosphate glass is used as the separating material 10.

The liquefied processing target substance is fed into the separation container 12 from a feed opening 26 opened in the upper portion of the separation container 12. As a method for feeding the liquefied processing target substance, a gravitational falling method may be used, or a pumping method by a pump or the like may be used. The inside of the separator is usually heated at a predetermined temperature of not more than 600° C. by the resistance heating element 24, thereby to keep the supplied processing target substance in a liquid state. A gas supplied from the pressurization system 20 can keep the inside of the separator body in an inert gas atmosphere (argon gas atmosphere or nitrogen gas atmosphere). An atmosphere depending on conditions can be provided by changing the gas to be supplied.

The processing target substance supplied to the separator body 14 is passed through the separating material 10, and is fed into the refined liquid receiver tank 18 through the refined liquid feeding pipe 16. When the processing target substance does not smoothly pass through the separating material 10 only by gravitation at this time, pressure can be applied to the inside of the separator body 14 by the pressurization system 20. Moreover, the processing target substance can be sucked into the refined liquid receiver tank 18 by operating the suction system 22 to reduce the pressure within the refined liquid receiver tank 18. Although application of pressure and suction may be performed simultaneously, pressure is applied appropriately depending on a flow of the processing target substance from the feed opening 26. The refined liquid is discharged from an exit 28 provided in the bottom of the refined liquid receiver tank 18.

As the separating material, an iron phosphate glass is used as mentioned above. As for the composition of the iron phosphate glass, an Fe/P ratio is 0.15 to 0.75. While the iron phosphate glass may have a shape of powders or a shape of fibers, preferably, the powders or fibers are heated once to the softening point of the iron phosphate glass, and are molded and processed so as to have a cartridge form. In the case of the powders, the iron phosphate glass is ground, and adjusted so as to have a particle size in a predetermined range using a standard sieve. In the case of the powders or fibers, a support screen made of a sintered glass or the like is placed on the bottom of the separation container 12, and the iron phosphate glass is charged onto the support screen. An opening of the separating material can be selected suitably in the range between 10 μm and 2 mm.

A separation test was performed using a facility of a laboratory scale. Fission products mainly containing elements such as alkali metals, alkaline earth metals, and rare earth elements were dissolved as chlorides into an LiCl—KCl electrolyte used as a medium in a pyro-reprocessing process. These chlorides were converted into phosphates. Then, since lithium and the rare earth elements form insoluble substances, approximately 100% of the produced particles could be separated using the filtration function of the separator. With respect to filtration of chlorides of rare earth elements, the iron phosphate glass powders having an opening of 1.18 to 2 mm functioned sufficiently. Moreover, owing to the sorption function of the separator, approximately 50% of the alkali metals other than lithium and the alkaline earth metals were also separated by passing the processing target substance through the separating material once. The thickness (height) of the separating material at that time was 4 mm and the temperature thereof was 550° C. Lithium phosphate had a smaller influence given on the composition of the medium, and was suitable as the phosphate conversion material.

Figure 2:
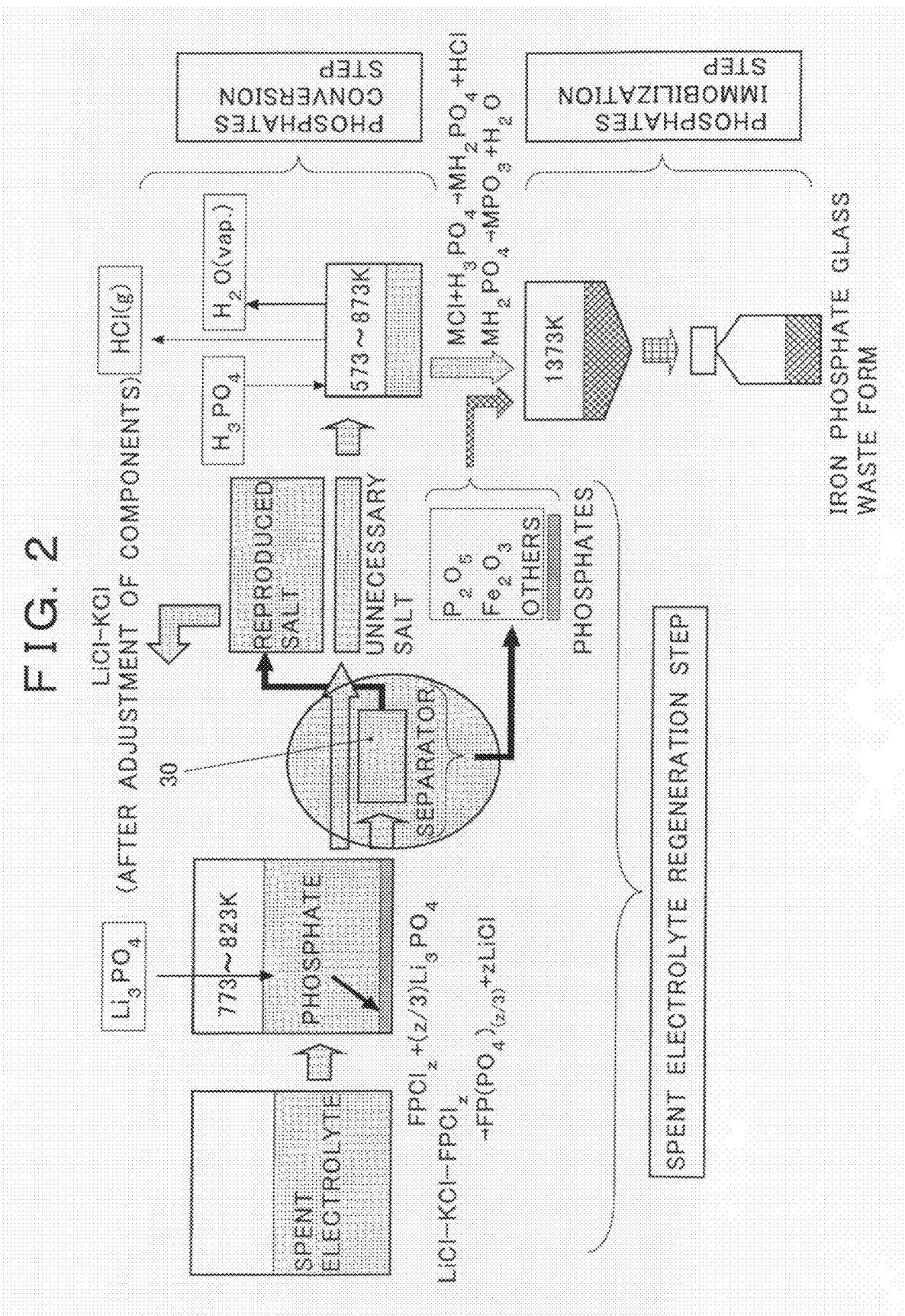
FIG. 2 is an explanatory view showing an example of a pyro-reprocessing process in which a method according to the present invention is used.

Such a separator 30 can be incorporated into a rear stage of the phosphate conversion process in the pyro-reprocessing process, as shown in FIG. 2, so that regeneration of the spent electrolyte and removal of the fission products can be performed easily. Since the pyro-reprocessing process itself is a known technique as described in Japanese Patent Laid-Open No. 2007-303934, detailed description thereof will be omitted. The refined electrolyte is re-used as an LiCl—KCl electrolyte after the components thereof are adjusted. Additionally, the separating material holding the fission products through filtration and sorption is turned into an iron phosphate glass waste form.

What is claimed is:

1. A method for separating fission products, comprising:
   subjecting a spent electrolyte produced in a pyro-reprocessing process to a phosphate conversion processing to obtain a processing target substance;
   passing the processing target substance through a separating material comprising an iron phosphate glass at a temperature of not more than a softening point of the iron phosphate glass in order to remove insoluble fission products included in the processing target substance by filtration with the separating material and to sorb fission products in solution to the separating material for separation; and
   using the iron phosphate glass holding the fission products as a waste vitrification material.

2. The method for separating fission products according to claim 1, wherein an atmosphere of the processing target substance is adjusted by an inert gas supplied from a pressurization system, and simultaneously applying pressure to a liquefied processing target substance so that passage of the separating material can be accelerated by the pressure added to the liquefied processing target substance.

3. An apparatus for separating fission products used for implementation of the method for separating fission products according to claim 1, the apparatus comprising:
   a separator body comprising a cylindrical separation container filled with a separating material;
   a feed opening for a processing target substance opened in an upper portion of the separation container;
   a refined liquid receiver tank that communicates with a lower portion of the separation container;
   a pressurization system that can apply pressure to the processing target substance supplied to the separation container;
   a suction system connected with the refined liquid receiver tank; and
   a heating element that controls a temperature within the apparatus; wherein the separating material comprises an iron phosphate glass.

4. The apparatus for separating fission products according to claim 3, wherein as composition of the iron phosphate glass, an Fe/P ratio is 0.15 to 0.75; and
   the iron phosphate glass is used as the separating material in a shape of powers or a shape of fibers, or used as the separating material by heating the powders or fibers to a softening point of the iron phosphate glass and molding and processing the powders or fibers so as to have a cartridge form.

5. An apparatus for separating fission products used for implementation of the method for separating fission products according to claim 2, the apparatus comprising:
- a separator body comprising a cylindrical separation container filled with a separating material;
- a feed opening for a processing target substance opened in an upper portion of the separation container;
- a refined liquid receiver tank that communicates with a lower portion of the separation container;
- a pressurization system that can apply pressure to the processing target substance supplied to the separation container;
- a suction system connected with the refined liquid receiver tank; and
- a heating element that controls a temperature within the apparatus; wherein the separating material comprises an iron phosphate glass.

6. The apparatus for separating fission products according to claim 5, wherein as composition of the iron phosphate glass, an Fe/P ratio is 0.15 to 0.75; and
- the iron phosphate glass is used as the separating material in a shape of powers or a shape of fibers, or used as the separating material by heating the powders or fibers to a softening point of the iron phosphate glass and molding and processing the powders or fibers so as to have a cartridge form.

* * * * *